Feb. 4, 1964 P. G. PERINICH 3,120,007
MULTI-PURPOSE TUBULAR STRUCTURAL MEANS
Filed Aug. 7, 1962 4 Sheets-Sheet 2
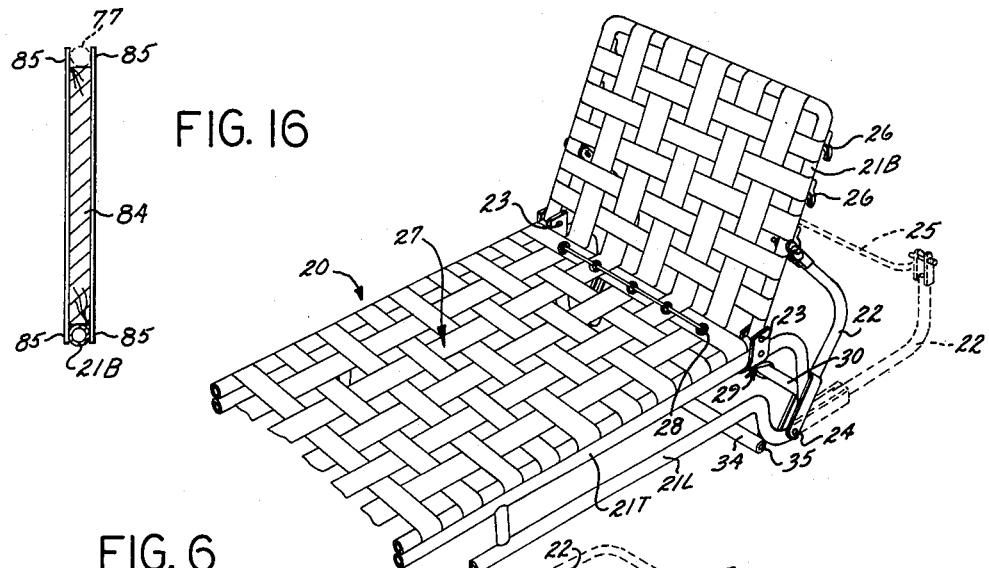
FIG. 16
FIG. 6
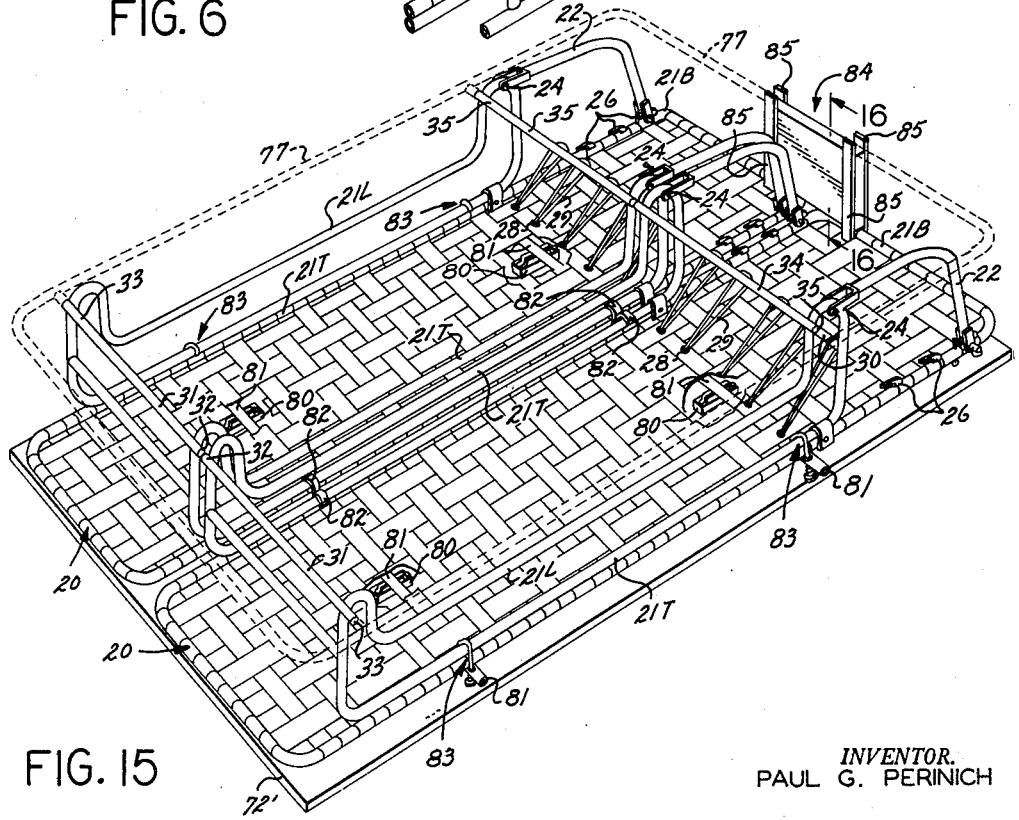
FIG. 15
INVENTOR.
PAUL G. PERINICH

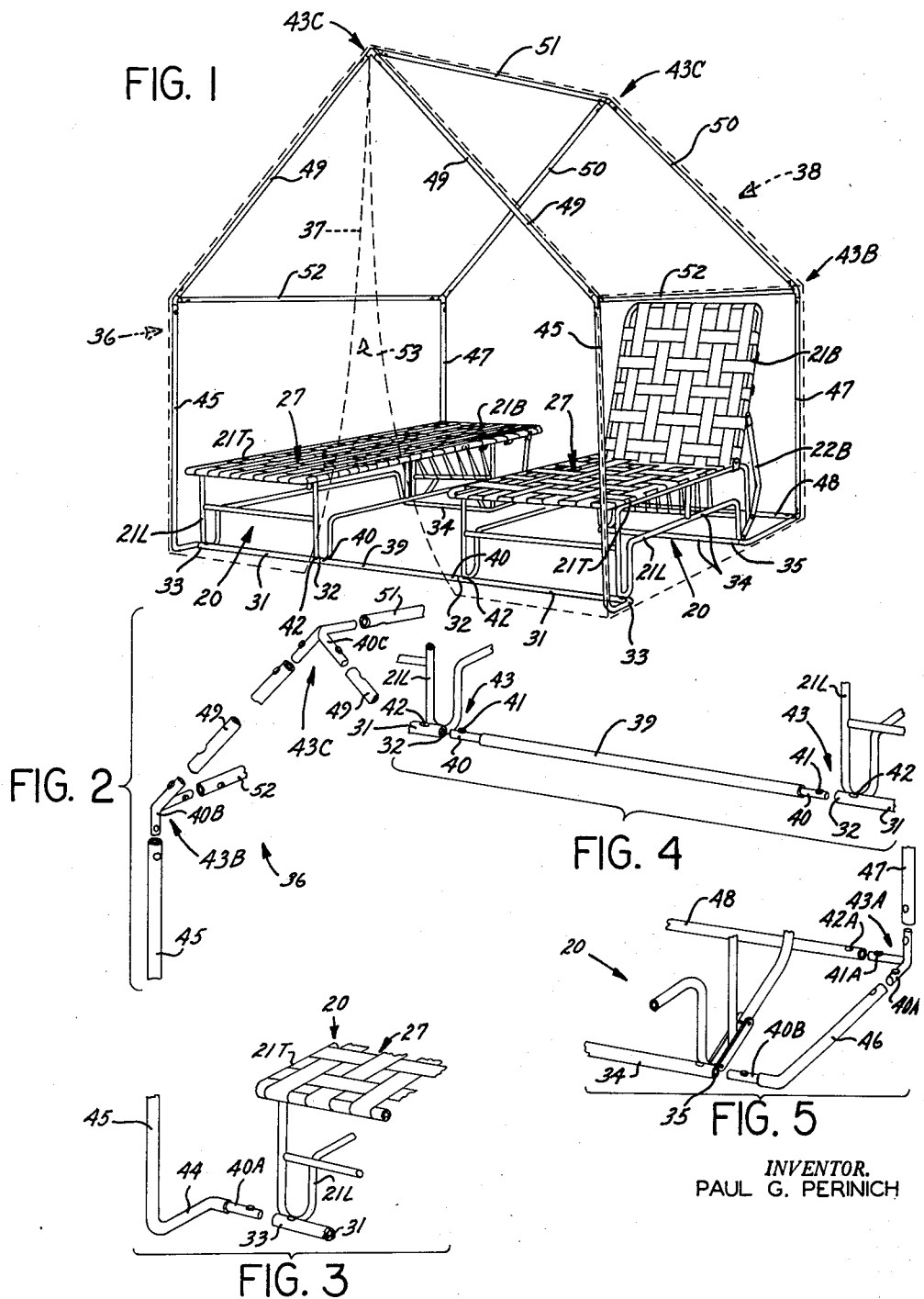

INVENTOR.
PAUL G. PERINICH

Feb. 4, 1964    P. G. PERINICH    3,120,007
MULTI-PURPOSE TUBULAR STRUCTURAL MEANS
Filed Aug. 7, 1962    4 Sheets-Sheet 4
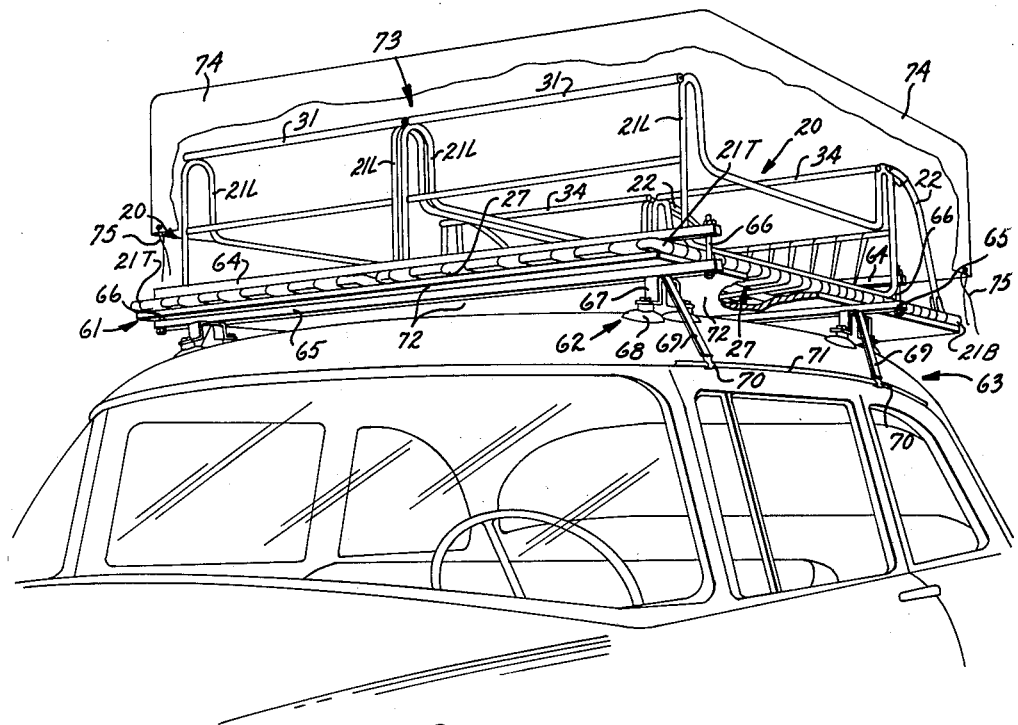
FIG. 11
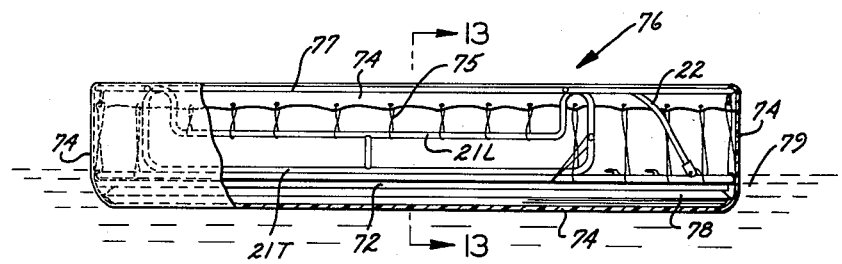
FIG. 12
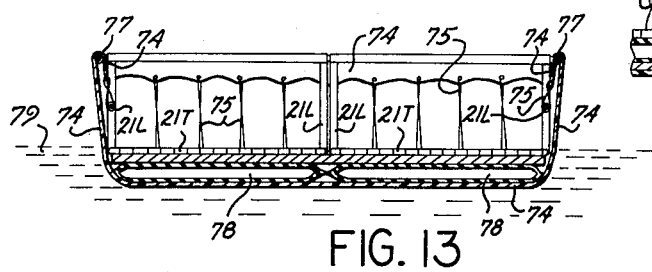
FIG. 13
FIG. 14
INVENTOR.
PAUL G. PERINICH

United States Patent Office 3,120,007
Patented Feb. 4, 1964

3,120,007
MULTI-PURPOSE TUBULAR STRUCTURAL MEANS
Paul G. Perinich, R.D. 2, Box 3–D, Fallbrook, Calif.
Filed Aug. 7, 1962, Ser. No. 215,344
5 Claims. (Cl. 5—119)

The present invention consists of a multi-purpose tubular structural means including adjustable reclining chair means which can be used in the conventional manner and which can be, when desired, effectively fastened together to provide the foundation of a quickly erectable and just as easily disassemblable portable tent frame adapted to support any suitable type of tent cover means which is usually of flexible thin-sheet material.

The novel multi-purpose tubular structural means of the present invention is also adapted to be inverted and effectively fastened together whereby to effectively provide and define a luggage carrier adapted to be clamped to the top of an automobile in a conventional manner.

The novel multi-purpose tubular structural means of the present invention is also adapted to be fastened together in inverted position and provided with auxiliary means including flexible thin-sheet boat bottom means drawn thereunder into an effectively concave configuration substantially enclosing the bottom and all sides thereof whereby to define a boat which, when carrying a specified number of occupants, will have an effective average density less than the volume of water displaced thereby, if almost fully immersed, so as to produce a net buoyant upward acting force on the complete boat unit defined by the structure of a magnitude such as to float the boat and contents at a safe immersion level.

The luggage carrier referred to above and the boat referred to above, in certain preferred forms, may include a rigid substantially flat sheet of material such as plywood, or the like, although not specifically so limited, and in certain forms of the invention, this is arranged to be quickly convertible by cooperation with certain of the structural elements of the remainder of the device into a portable, easily assembled and easily disassembled table.

It should also be noted that, in certain forms of the invention, the structural means may be provided with underlying wheeled means and means for clamping same to the rear bumper of a motor vehicle, or the like, for transport to any desired location, after which it can be easily removed from the automobile and pushed like a wheelbarrow or pulled, if desired, to any desired utilization spot, such as a picnic spot, a beach site, a camping place, or the like.

It should also be noted that the luggage carrier aspect of the present invention provides a convenient structural unit for attachment to auxiliary structural means whereby to provide a side-extended tent or shade panel, when desired.

It should also be noted that the reclining chair structures may be provided with various types of shade structures and/or structures to define a portable cabana.

It should further be noted that an important feature of the present invention which makes it possible to quickly assemble and disassemble the various structures referred to above is the novel engaging and locking means of the present invention for quickly engaging and locking together adjacent structural portions. This comprises what might be termed a quick connection slip joint which may join together two structural members, three structural members, four structural members, or virtually any desired number of structural members in any desired angular relationships with respect to each other. The engaging and locking means is of a type which is quickly engageable and disengageable and yet which provides a very firm and effective locking engagement, and the present invention is directed to such slip joint connectors and/or engaging and locking means, per se, in addition to the combination thereof with the multi-purpose tubular structural means of the present invention.

It is an object of the present invention to provide a novel multi-purpose structural means of the character referred to above which is capable of being quickly and easily arranged to define any of the various structures referred to above and which is of extremely simple, inexpensive, cheap, lightweight, readily portable, foolproof, and highly effective construction such as to be conducive to widespread use thereof.

It is a further object of the present invention to provide, in combination with the apparatus defined in the preceding object and also individually or, per se, the novel slip joint connector and/or engaging and locking means of the present invention referred to above which makes it possible to quickly and easily assemble and disassemble the various structural elements of the multi-purpose structural means of the present invention.

Further objects are implicit in the detailed description which follows hereinafter and will be apparent to persons skilled in the art after a careful study thereof.

For the purpose of clarifying the nature of the present invention, several exemplary embodiments are illustrated in the hereinbelow-described figures of the accompanying drawings and are described in detail hereinafter.

FIG. 1 is a perspective view showing one exemplary embodiment of the present invention in the form wherein it effectively defines tent frame means for use in carrying a flexible tent cover whereby to provide an easily assemblable and readily disassemblable portable tent which has built right into it two adjustable reclining chairs which, when flat, effectively define bed-like structures suitable for sleeping use by occupants of the tent.

FIG. 2 is a fragmentary, partially broken away, exploded, perspective view illustrating a portion of the tent frame structure of FIG. 1 located at the left side of FIG. 1 and shows the slip joint connector and/or engaging and locking means of the present invention in certain specific forms which facilitate quick and easy assembly and disassembly of the entire tent structure. It should be understood that these are illustrative of all of the slip joint connectors and/or engaging and locking means at the various junctions of the various structural elements of the tent frame means shown in FIG. 1.

FIG. 3 is another fragmentary, partially broken away and partially exploded view, this time illustrating the junction of the tent frame structure means to the front of the left reclining chair means shown in FIG. 1, and showing the slip joint connector and/or engaging and locking means facilitating the quick engagement and disengagement thereof. It should be understood that the corresponding joint connected to the right reclining chair shown in FIG. 1 is of a similar structure.

FIG. 4 is a further fragmentary, partially broken away, exploded, perspective view of the front center bottom portion of the tent frame structure shown in FIG. 1 illustrating the transversely laterally spaced fastening of the two reclining chair frames by a front transverse base member.

FIG. 5 is a further fragmentary, partially broken away, exploded perspective view, this time illustrating the junction of the tent frame structure means to the rear of the right reclining chair means shown in FIG. 1 and showing the several slip joint connectors and/or engaging and locking means facilitating the quick engagement and disengagement thereof.

FIG. 6 is a fragmentary, partially broken away view illustrating the adjustable and/or removable connection of the chair back of either of the reclining chairs.

FIG. 11 is a perspective view illustrating the multipurpose novel structural means of the present invention in inverted fastened form whereby to define a luggage carrier provided with means for attaching it to the top of an automobile. This view shows a flexible cover and fastening means therefor in exploded relationship with respect to the luggage carrier, it being understood that after the luggage carrier is loaded with various objects of luggage, or the like, which is to be carried, the cover means would normally be lashed into place thereover.

FIG. 12 is a view, partly in longitudinal section and partly in elevation, of the novel multi-purpose structural means of the present invention arranged to define a boat.

FIG. 13 is a cross-sectional view of the boat-defining structure taken on a plane such as indicated by the arrows 13—13 of FIG. 12.

FIG. 14 is a fragmentary view generally similar to a portion of FIG. 13 and illustrates a slightly modified positioning arrangement for the rigid bottom stiffener member.

FIG. 15 is a perspective view of the inverted type of reclining chair arrangement comprising the luggage carrier of FIG. 11 and the boat of FIGS. 12 and 13 wherein it is shown in fastened relationship with respect to a different type of rigid bottom stiffener member which may be used in either the luggage carrier of FIG. 11 or the boat of FIGS. 12 and 13. It should be noted that, in this view, certain portions of the longitudinal and transverse strips of material effectively comprising the webbing carried by the two inverted chair frames are broken away in order to more clearly show the mounting members underlying said broken away portions and carried by the stiffener board at the bottom of the entire structure shown in this figure.

FIG. 16 is a fragmentary sectional view, with certain parts removed for drawing simplification reasons, taken in the direction of the arrows 16—16 of FIG. 15 and illustrates a controllably engageable outboard motor mounting panel member adapted to be engaged between and carried by similar portions of the top rear frame members of the inverted chairs and the corresponding parts of the overlying superimposed rectangular boat top frame shown in phantom in FIG. 15.

Figure 7:
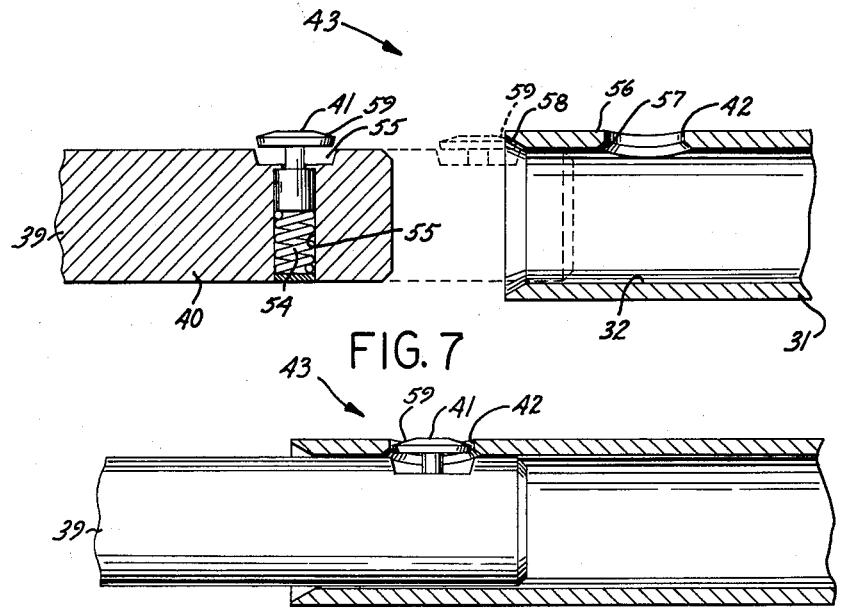
FIG. 7 is an enlarged, fragmentary sectional view through any one of the slip joint connectors and/or engaging and locking means of the present invention showing same in solid lines in disengaged relationship and showing same in broken lines in the process of being moved into engaged relationship as shown in FIG. 8.
Figure 8:
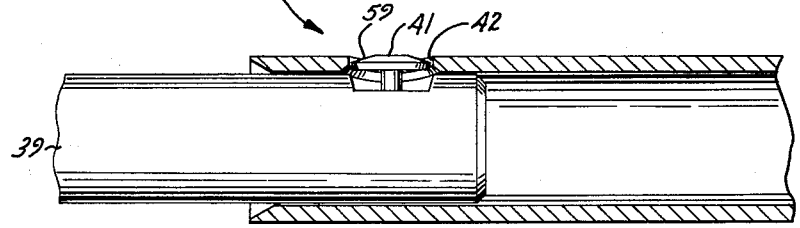
FIG. 8 is a view similar to FIG. 7 except that the left element of the slip joint connector means and/or engaging and locking means is shown in elevation rather than in section and is shown after engagement with the right tubular structural element.

The tent structure arrangement of the novel multipurpose structure means of the present invention is illustrated in FIGS. 1–6, while one typical type of slip joint connector and/or engaging and locking means employed therein is illustrated in FIGS. 7 and 8. Therefore, said tent structure arrangement and said specific slip joint connector and/or engaging and locking means will be described first, as follows:

Referring to FIGS. 1–8 for exemplary purposes, one illustrative embodiment of the invention takes a typical exemplary form wherein it includes two reclining chairs, such as indicated generally at 20, with each chair including a tubular bottom or lower frame portion 21L, a tubular top or upper frame portion 21T, a tubular rear or back frame portion 21B, which effectively comprises a back rest portion, and a tubular support means 22.

The lower frame portion 21L is suitably fastened below the top frame portion 21T by riveting, screws, welding, or any other suitable fastening means, while the rear or back rest portion 21B is effectively pivotally or hingedly attached by pivot pin means 23 with respect to the rear ends of side parts of the top tubular frame portion 21T whereby the rear portion or back rest portion 21B is vertically pivotally adjustable between the flat horizontal position shown at the left of FIG. 1 and the upper position shown at the right of FIG. 1 (also FIG. 6).

The tubular support means 22 is hingedly or pivotally attached, as indicated at 24, to the rear bottom part of the bottom frame portion 21L for adjustable movement in a manner such as to allow a transverse member 25 to engage any of a plurality of spaced hook means 26 carried by the rear of the back rest portion 21B, thus making it possible to position and support the back rest 21B in any of a plurality of positions between horizontal and substantially vertical.

Each of the reclining chairs 20 is provided with flexible thin-sheet body-receiving means carried by the top frame portion 21T and the rear or back rest frame portion 21B, as indicated at 27.

In the specific form illustrated, this comprises a plurality of spaced longitudinal strips of flexible material interlaced with a plurality of spaced transverse strips of flexible material fastened to edge portions of the top frame portion 21T and rear frame portion 21B. The longitudinal and transverse strips of material may be adhesively fastened to the frame portions or fastened thereto in any other suitable manner.

Furthermore, if desired, said strips attached to the top frame portion 21T may be separate from the strips attached to the back frame portion 21B whereby to allow the back frame portion 21B to be removed entirely from the remainder of the structure, if desired, by removing the pivot pin means 23. However, the invention is not limited to this arrangement.

Furthermore, it should be noted that the last transverse strip of thin-sheet material 27 carried at the back of the top frame portion 21T may be provided with suitable fastening means, such as grommets 28, or the like, for effectively connecting same by tensile means 29 to a lower cross bar 30 whereby to hold the longitudinal strips of the flexible material 27 taut at all times.

Each of the chairs 20 is also provided with a lower front transverse tubular base portion or member 31 having inner receiving portions 32 and outer receiving portions 33. This structure will be described in greater detail hereinafter.

Also each of the chairs 20 is provided with a lower back transverse tubular base portion or member 34 having an outer receiving portion 35. This structure will be described in greater detail hereinafter.

The transverse tubular members 31 and 34 are adapted for use in receiving and locking various of the structural members of the tent frame together whereby to provide the complete tent frame structure indicated generally at 36 in FIG. 1, which is adapted to carry thereover a flexible tent cover, such as is shown in broken lines at 37 in FIG. 1 whereby to define the entire portable tent shown in FIG. 1 and designated by the reference numeral 38.

The tent 38 shown in FIG. 1 includes two of the reclining chair frames 20 positioned in laterally spaced relationship (usually on an underlying supporting surface such as a flat area of earth or any other suitable supporting surface) and fastened in said spaced relationship by providing a front transverse base member 39 (which may be of solid or tubular construction) which has junction means or portions 40 at each end thereof and radially outwardly spring biased catch means 41 (see FIGS. 7 and 8) adapted to be inserted into the hollow tubular receiving portions 32 of the transverse tubular base portions or members 31 until the catches 41 are received within and retained by the catch-receiving recesses 42, as is best illustrated in sequence with respect to one such slip joint connector and/or engaging and locking means 43, by the two sequential positions shown in enlarged detail in FIGS. 7 and 8.

This transverse base member 39 effectively comprises what may be termed a spreader bar adapted to lock the two reclining chairs 20 in the spaced relationship shown in FIG. 1.

It should be noted that, if desired, the rear transverse tubular base portions 34 may be provided with a similar transverse spreader bar in order to provide an extremely rigid base or foundation for the tent frame 36. However, this is usually not necessary and this is not shown in FIG. 1.

The receiving portions 33 at the outer ends of the front transverse tubular base portions or members 31 are adapted to receive junction means 40A carried at right angles with respect to lower longitudinal forwardly directed members or portions 44 which effectively carry and comprise a part of each of the left and right forward upright tubular structural members 45. The upper ends of these are adapted to carry the top portion of the tent frame structure 36 in a manner which will be described hereinafter.

The receiving portions 35 at the outer ends of the rear transverse tubular base portions or members 34 are adapted to receive junction means 40B carried at right angles with respect to lower longitudinal rearwardly directed members or portions 46 which effectively carry the left and right rearward upright tubular structural members 47. The upper ends of these are adapted to carry the top portion of the tent frame structure 36 in a manner which will be described hereinafter.

Each of the longitudinal rearwardly directed portions or members 46 is also adapted to effectively carry or be fastened to the corresponding end of a back transverse tubular base member 48 whereby to provide a rigid foundation or base structure for the entire tent frame 36.

In the specific example illustrated, as best shown in FIG. 5 with respect to the right rear corner of the tent frame 36, but also equally applicable with respect to the left rear corner of the tent frame 36, the connection of the rear vertical upright members 47 and the back transverse tubular base member 48 is accomplished by the slip joint connector means, indicated generally at 43A, and consisting of three junction means 40A lying along three mutually perpendicular axes, and each being provided with catch means 41A adapted for cooperation with the corresponding catch-receiving recess means 42A in a manner similar to that shown in detail in FIGS. 7 and 8 and described hereinbefore.

Each of the four upright members comprising the two front upright members 45 and the two rear upright members 47, is provided with slip joint connector means and/or engaging and locking means indicated generaly at 43B and including elements similar to those described in detail at 43A in FIG. 5 and at 43 in FIGS. 7 and 8.

The arrangement is such as to effectively connect front angular upwardly directed tubular rafter members 49 to the front upright members 45 at their lower ends and to connect them at their upper ends to a front ridge pole slip joint connector or engaging and locking means indicated generally at 43C, and such as to effectively connect rear angularly upwardly directed tubular rafter members 50 to the rear upright members 47 at their lower ends and to connect them at their upper ends to a rear ridge pole slip joint connector or engaging and locking means indicated generally at 43C.

Each of the slip joint connectors and engaging and locking means 43C is connected to the ridge pole longitudinal tubular structural member 51, thus defining the complete tent frame structure indicated generally at 36, with all of the junctions being provided by the readily engageable and disengageable slip joint connector means and engaging and locking means of the types indicated at 43, 43A, 43B, and 43C—all of which merely vary in angular relationship and/or number of the junction means and the receiving portions of the adjacent hollow tubular members but all of which are structurally equivalent to the form shown in detail at 43 in FIGS. 7 and 8.

It should be noted that the four corner slip joint connectors and/or engaging and locking means 43B effectively connect upper side tubular frame members 52 between the corresponding front and rear upstanding frame members 45 and 47.

The members 49, 50, 51, and 52 effectively comprise tent frame top means which can be said to be removably slip-joint-connected to the four upright tent frame corner posts shown at 44 and 47; the resultant part of the tent frame 36 being adapted to carry the flexible thin-sheet tent wall means 37 in any suitable effectively encompassing manner whereby to provide a roomlike enclosure usually having tent door means, such as indicated at 53 (which may include a closure flap, if desired), to allow ingress and egress with respect to the interior of the tent 38.

As best shown in FIG. 7, the catch 41 of the typical exemplary slip joint connector and engaging and locking means 43 is provided with biasing spring means 54 carried in a recess 55 in the insert means 40 whereby to normally bias the catch 41 outwardly from the recess 55 into an extended position such as that shown in FIG. 7. Also, as shown in FIGS. 7 and 8, the catch-receiving recess means 42 is carried in a side wall portion 56 of the receiving portion or means 32 of the transverse tubular member 31 and has an inner bevelled portion as shown at 57 around the recess 42 and also has a bevelled portion 58 at the end of the receiving end or portion 32 whereby movement of the junction insert means 40 from the solid line position shown in FIG. 7 into the broken line position shown in FIG. 7, causes the bevelled portion 59 of the catch 41 to strike the corresponding bevelled portion 58 whereby to effectively inwardly force the catch 41 so as to allow the junction insert means 40 to move into the position shown in FIG. 8, at which time the spring 54 will force the catch 41 outwardly into the catch-receiving recess 42, where it wil be retained. When disengagement is desired, digital pressure can be applied to the catch 41 in an inward direction and the disengaging procedure can be started. This is facilitated by reason of the fact that the bevel 59 cooperates with the bevel 57 just as soon as the disengaging operation has started and facilitates the completion of the disengaging operation.

Figure 9:
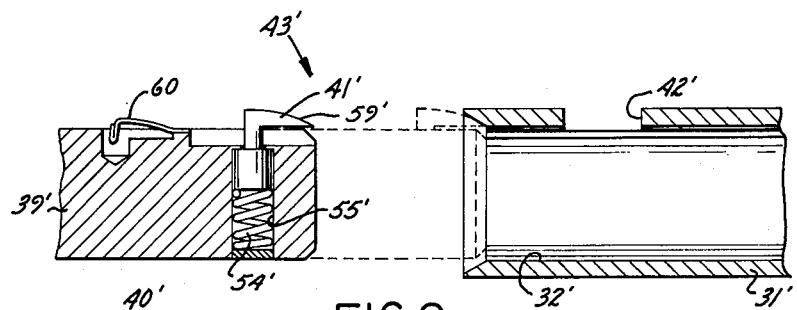
FIG. 9 is a view similar to FIG. 7 but illustrates a slightly modified form of the slip joint connector means and/or engaging and locking means.
Figure 10:
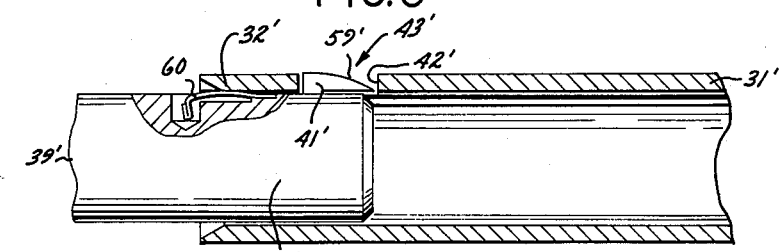
FIG. 10 is a view similar to FIG. 8 but illustrates the modified form of slip joint connector and/or engaging and locking means of FIG. 9 after engagement.

FIGS. 9 and 10 illustrate a slight modification of the slip joint connector and engaging and locking means 43 shown in FIGS. 7 and 8 and similar parts are indicated by similar reference numerals, primed, however.

In this modification, the catch 41' is of different shape than that illustrated in FIGS. 7 and 8 and the junction insert means 40' is additionally provided with cantilever spring means 60 adapted to frictionally engage the inside of the receiving portion 32' whereby to frictionally immobilize the joint elements when in the joined position shown in FIG. 10.

No further detailed description is thought necessary of this modification in view of the extensive description of the first form shown in FIGS. 7 and 8.

FIG. 11 illustrates a further modification of the invention wherein two of the chair frames 20 are placed in upside-down, side-by-side, contiguous relationship and are provided with fastening means, indicated generally at 61, for rigidly fastening them together. The fastening means 61 is additionaly provided wtih means, indicated generally at 62, for effective attachment or fastening with respect to the top of a motor vehicle, such as is indicated generally at 63.

In the specific example illustrated in FIG. 11, the fastening means 61 comprises two longitudinally spaced upper transverse members 64 and two similar longitudinally spaced lower transverse members 65, with each pair of vertically opposed upper and lower transverse members 64 and 65 engaging opposite surfaces of the frames 21T (and the back portions 21B at the opposite ends thereof) of the two chairs 20 and being fastened by threaded fastener means 66 in a tightly clamped relationship with respect thereto whereby to firmly grip and hold the two chair frames 20 in the inverted side-by-side relationship shown in FIG. 11.

In the specific example illustrated, the fastening or attachment means 62 is of a conventional type and includes four brackets 67 fastened to the lower transverse members 65 on each side of the car top 63 and being provided with downwardly directed suction cup means 68 and means 69 having fastening clamp means 70 adapted to grip the outwardly projecting molding strip portion 71 of the automobile top 63. The portions 70 may be provided with compressible or elastomeric protective pad means to avoid marring the paint finish of the automobile top 63, if desired.

In one preferred form of the invention, a substantial rectangular stiffener sheet or panel, such as is indicated at 72, may underlie the thin-sheet fabric material 27 of the two chairs 20, whereby to prevent any small objects stored on the luggage carrier, indicated generally at 73, from inadvertently passing through the spaces between the strips of the webbing 27 and possibly becoming lost. However, it should be clearly noted that this stiffener panel 72 may be eliminated in certain forms of the invention, if desired.

The luggage carrier 73 may, if desired, be provided with protective cover means and means for fastening same over the luggage carrier. One typical form of such protective cover means is shown fragmentarily in an exploded relationship with respect to the luggage carrier 73 at 74 and the fastening means is indicated generally at 75.

FIGS. 12 and 13 illustrate another configuration of the multi-purpose tubular structural means of the present invention wherein it effectively comprises a boat, such as is indicated generally at 76, which includes the inverted joined arrangement of the two chairs 20, such as is shown in the luggage carrier 73 shown in FIG. 11 (except for the fastening means 61), with said inverted joined chair frames 20 being provided with additional substantially rectangularly arranged structural member means 77 joined at the corners and joined to the front and rear transverse tubular portions 31 and 34 by slip joint connectors and engaging and locking means of the type shown in the first form of the invention illustrated in FIGS. 1–7 and indicated generally by the reference numerals 43, 43A, 43B, and/or 43C. This comprises structural means for fastening the pair of inverted chair frames 20 in side-by-side contiguous relationship and substitutes for the fastening means 61 shown in the luggage carrier form of the invention illustrated in FIG. 11.

Hollow float means is adapted to be placed underneath the joined inverted chair frames 20 and either over or under the stiffener panel 72 which was employed in the luggage carrier 73 as shown in FIG. 11.

In the version of the invention illustrated in FIGS. 12 and 13, the float means comprises two flexible hollow air or gas-filled members 78, such as conventional air mattresses, or the like, lying in side-by-side relationship along the length of the boat 76 underneath the joined inverted chair frames 20 and immediately over the underlying flexible thin-sheet boat bottom means 74, which actually comprises the luggage cover means 74 shown in FIG. 11, and which is drawn upwardly around the assembled boat structure whereby to lie in an effectively concave configuration substantially enclosing the bottom and sides of the boat structure, and then the top edge of the member 74 is drawn over the member 77 and is fastened by the fastening means 75 to the lower frame portions 21L at each side of the joined chair frames 20 and also to side and end portions of the top front and rear frame members 21T and 21B whereby to provide the complete boat structure 76 which effectively defines an enclosure therein of a volume such, with respect to the overall weight of the entire device plus a specified number of occupants, as to produce an effective average density less than the volume of water 79 displaced if the boat 76 is almost fully immersed, whereby to produce a net buoyant upward acting force on the complete boat unit 76 which effectively floats the boat.

FIGS. 12 and 13 illustrate the stiffener board 62 in one position, while the fragmentary view comprising FIG. 14 illustrates it in another position. It should also be noted that in certain forms of the invention, the stiffener board 62 may be eliminated entirely.

FIG. 15 illustrates a slight modification of the means for fastening the two inverted chair frames 20 together for use in either a luggage carrier of the kind shown at 73 in FIG. 11 or a boat of the kind shown at 76 in FIGS. 12 and 13.

In this modification, the stiffener board 72' is provided with mounting members 80 which carry longitudinally spaced transversely directed parallel members 81 which carry at their centers pairs of twin opposed outwardly directed hook means 82 adapted to engage side portions of the top frame 21T of the adjacent inverted chairs 20 along the central junction region thereof. Said transverse parallel members 81 are provided adjacent their outer ends with spring catch means 83 adapted to removably resiliently engage outer portions of the top frame 21T of the inverted side-by-side chair frames 20, thus providing an arrangement rigidly locking and fastening the two chairs 20 in the inverted relationship shown in FIG. 15.

It should be noted that the structure shown in FIG. 15 may be provided with a controllably removably engageable and disengageable outboard motor mounting panel, indicated generally at 84, which is provided at the top and bottom with spaced spring or snap clamp means 85 adapted to resiliently engage corresponding parts of the rear chair frame members 21B, which are in the lowermost position as shown in FIGS. 15 and 16, and also adapted to engage corresponding parts of the boat frame member 77, which is in an uppermost position as shown in FIGS. 15 and 16. This provides an arrangement for effectively positioning the outboard motor mounting panel 84 at the rear of the boat where it can be quickly and easily engaged by the mounting clamp of a conventional outboard motor, or the like, so that the boat may effectively comprise a motor boat. Of course, it should be understood that the snap clamps 85 are exemplary only and are not to be construed as specifically limiting the invention thereto. Actually, any type of attachment means may be employed.

It should be clearly noted that the slip joint connectors of the present invention may be modified substantially within the basic spirit, scope, and teachings of the present invention. For example, certain of the junction means or portions thereof may be permanently attached to the adjacent structural member such as by welding, mechanical attachment, or otherwise, whereby to leave a lesser number than shown in the drawings of the junction means requiring the catch and catch-receiving recess means for removable engagement. Also, it should be noted that the arrangement of insert and receiving portions of the slip joint connectors and engaging and fastening means may be positionally reversed in certain forms of the invention. This also may be true of the direction of operation of the catch with respect to the catch-receiving recess means in certain forms of the invention.

I claim:

1. A multi-purpose structural means comprising: two reclining chair frames, each chair frame being provided with means for mounting between side portions thereof a flexible thin sheet body-receiving means, each chair frame including a lower front transverse base portion provided with a lower front transverse engaging and locking means for engaging and rigidly locking with respect thereto an adjacent end of an auxiliary front transverse base member adapted to be fastened thereto, each chair frame including a forward side portion provided with a forward side engaging and locking means for engaging and rigidly locking with respect thereto an adjacent lower end portion of an auxiliary forward upright member adapted to be fastened thereto, each chair frame including a rearward side portion provided with rearward side engaging and locking means for engaging and rigidly locking with respect thereto an adjacent lower end portion of an auxiliary rearward upright member adapted to be fastened thereto, each chair frame including a lower back transverse base portion provided with lower back transverse engaging and locking means for engaging and rigidly locking with respect thereto an adjacent end of an auxiliary back transverse base member adapted to be fastened thereto, said two reclining chair frames being positioned in upside down side-by-side adjacent contiguous relationship, provided with fastening means for rigidly fastening them together and also provided with means for fastening them in said upside down side-by-side relationship with respect to the top of a motor vehicle body whereby to comprise and define luggage carrier means having a plurality of upwardly projecting spaced portions of the inverted chair frames defining therebetween luggage-receiving recess means.

2. A multi-purpose structural means comprising: two reclining chair frames, each chair frame being provided with means for mounting between side portions thereof a flexible thin sheet body-receiving means, each chair frame including a lower front transverse base portion provided with a lower front transverse engaging and locking means for engaging and rigidly locking with respect thereto an adjacent end of an auxiliary front transverse base member adapted to be fastened thereto, each chair frame including a forward side portion provided with a forward side engaging and locking means for engaging and rigidly locking with respect thereto an adjacent lower end portion of an auxiliary forward upright member adapted to be fastened thereto, each chair frame including a rearward side portion provided with rearward side engaging and locking means for engaging and rigidly locking with respect thereto an adjacent lower end portion of an auxiliary rearward upright member adapted to be fastened thereto, each chair frame including a lower back transverse base portion provided with lower back transverse engaging and locking means for engaging and rigidly locking with respect thereto an adjacent end of an auxiliary back transverse base member adapted to be fastened thereto, said two reclining chair frames being positioned in upside down side-by-side adjacent contiguous relationship, provided with fastening means for rigidly fastening them together and also provided with means for fastening them in said upside down side-by-side relationship with respect to the top of a motor vehicle body whereby to comprise and define luggage carrier means having a plurality of upwardly projecting spaced portions of the inverted chair frames defining therebetween luggage-receiving recess means; and bottom closure panel means interposed between said joined inverted pair of reclining chair frames defining the luggage carrier means and the top of the motor vehicle body.

3. A multi-purpose structural means comprising: two reclining chair frames, each chair frame being provided with means for mounting between side portions thereof a flexible thin sheet body-receiving means, each chair frame including a lower front transverse base portion provided with a lower front transverse engaging and locking means for engaging and rigidly locking with respect thereto an adjacent end of an auxiliary front transverse base member adapted to be fastened thereto, each chair frame including a forward side portion provided with a forward side engaging and locking means for engaging and rigidly locking with respect thereto an adjacent lower end portion of an auxiliary forward upright member adapted to be fastened thereto, each chair frame including a rearward side portion provided with rearward side engaging and locking means for engaging and rigidly locking with respect thereto an adjacent lower end portion of an auxiliary rearward upright member adapted to be fastened thereto, each chair frame including a lower back transverse base portion provided with lower back transverse engaging and locking means for engaging and rigidly locking with respect thereto an adjacent end of an auxiliary back transverse base member adapted to be fastened thereto, said two reclining chair frames being positioned in upside down side-by-side adjacent contiguous relationship, provided with fastening means for rigidly fastening them together and also provided with means for fastening them in said upside down side-by-side relationship with respect to the top of a motor vehicle body whereby to comprise and define luggage carrier means having a plurality of upwardly projecting spaced portions of the inverted chair frames defining therebetween luggage-receiving recess means; and protective cover means and means for fastening same over said luggage carrier means.

4. A multi-purpose structural means comprising: two reclining chair frames, each chair frame being provided with means for mounting between side portions thereof a flexible thin sheet body-receiving means, each chair frame including a lower front transverse base portion provided with a lower front transverse engaging and locking means for engaging and rigidly locking with respect thereto an adjacent end of an auxiliary front transverse base member adapted to be fastened thereto, each chair frame including a forward side portion provided with a forward side engaging and locking means for engaging and rigidly locking with respect thereto an adjacent lower end portion of an auxiliary forward upright member adapted to be fastened thereto, each chair frame including a rearward side portion provided with rearward side engaging and locking means for engaging and rigidly locking with respect thereto an adjacent lower end portion of an auxiliary rearward upright member adapted to be fastened thereto, each chair frame including a lower back transverse base portion provided with lower back transverse engaging and locking means for engaging and rigidly locking with respect thereto an adjacent end of an auxiliary back transverse base member adapted to be fastened thereto; and means for fastening said two reclining chair frames, when in collapsed inverted relationship, together in side-by-side adjacent contiguous relationship and provided with upper frame extension means and underlying flexible thin-sheet water-impervious boat bottom means drawn thereunder and partially therearound into an upwardly concave configuration substantially enclosing the bottom and sides of said joined inverted pair of reclining collapsed chair frames and said upper frame extension means whereby to define a complete boat unit having an enclosure therewithin of a volume such, with respect to the overall weight of the entire device plus a specified total occupant weight, as to produce an effective average density less than the density of water in which the boat is to be floated whereby to produce a net buoyant upward-acting force on the complete boat unit defined by the structure.

5. A multi-purpose structural means comprising: two reclining chair frames, each chair frame being provided with means for mounting between side portions thereof a flexible thin sheet body-receiving means, each chair frame including a lower front transverse base portion provided with a lower front transverse engaging and locking means for engaging and rigidly locking with respect thereto an adjacent end of an auxiliary front transverse base member adapted to be fastened thereto, each chair frame including a forward side portion provided with a forward side engaging and locking means for engaging and rigidly locking with respect thereto an adjacent lower end portion of an auxiliary forward upright member adapted to be fastened thereto, each chair frame including a rearward side portion provided with rearward side engaging and locking means for engaging and rigidly locking with respect thereto an adjacent lower end portion of an auxiliary rearward upright member adapted to be fastened thereto, each chair frame including a lower back transverse base portion provided with lower back transverse engaging and locking means for engaging and rigidly locking with respect thereto an adjacent end of an auxiliary back transverse base member adapted to be fastened thereto; and means for fastening said two reclining chair frames, when in collapsed inverted relationship, together in side-by-side adjacent contiguous relationship and provided with upper frame extension means and underlying flexible thin-sheet water-impervious boat bottom means drawn thereunder and partially therearound into an upwardly concave configuration substantially enclosing the bottom and sides of said joined inverted pair of reclining collapsed chair frames and said upper frame extension means whereby to define a complete boat unit having an enclosure therewithin of a volume such, with respect to the overall weight of the entire device plus a specified total occupant weight, as to produce an effective average density less than the density of water in which the boat is to be floated whereby to produce a net buoyant upward-acting force on the complete boat unit defined by the structure; and fastening means for fastening top edges of said flexible thin-sheet boat bottom means over and inside of top edge portions of the complete boat unit defined by the inverted pair of reclining chair frames and said upper frame extension means.

References Cited in the file of this patent

UNITED STATES PATENTS

| | | |
|---|---|---|
| 1,673,626 | Johnson | June 12, 1928 |
| 2,337,955 | Wright | Dec. 28, 1943 |
| 2,640,999 | Sheppard | June 9, 1953 |
| 2,710,050 | Du Bois | Jan. 7, 1955 |

FOREIGN PATENTS

| | | |
|---|---|---|
| 856,890 | Great Britain | Dec. 21, 1960 |